United States Patent
Gallagher (10) Patent No.: US 10,103,894 B2
(45) Date of Patent: *Oct. 16, 2018

(54) CREATING A DIGITAL CERTIFICATE FOR A SERVICE USING A LOCAL CERTIFICATE AUTHORITY

(71) Applicant: Red Hat, Inc., Raleigh, NC (US)

(72) Inventor: Stephen John Gallagher, Methuen, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/275,102

(22) Filed: Sep. 23, 2016

(65) Prior Publication Data
US 2017/0012786 A1   Jan. 12, 2017

Related U.S. Application Data (63) Continuation of application No. 14/566,489, filed on Dec. 10, 2014, now Pat. No. 9,455,838.

(51) Int. Cl.
*H04L 29/06* (2006.01)
*H04L 9/32* (2006.01)

(52) U.S. Cl.
CPC ............ *H04L 9/3268* (2013.01); *H04L 9/321* (2013.01); *H04L 63/062* (2013.01); *H04L 63/0823* (2013.01); *H04L 63/1466* (2013.01)

(58) Field of Classification Search
CPC ..... H04L 9/321; H04L 9/3263; H04L 9/3265; H04L 9/3268; H04L 63/08; H04L 63/0823
See application file for complete search history.

(56) References Cited

U.S. PATENT DOCUMENTS

| 8,261,080 | B2 | 9/2012 | Wilkie et al. | |
|---|---|---|---|---|
| 8,447,971 | B2 | 5/2013 | Campagna et al. | |
| 8,533,482 | B2 | 9/2013 | Sun et al. | |
| 8,589,691 | B1* | 11/2013 | Hackborn | H04L 9/3263 713/176 |
| 8,843,740 | B2 | 9/2014 | Brown et al. | |
| 2006/0020811 | A1* | 1/2006 | Tan | H04L 63/067 713/180 |

(Continued)

FOREIGN PATENT DOCUMENTS

EP   2608477 A1   6/2013

OTHER PUBLICATIONS

Microsoft, "How to: Create and Install Temporary Client Certificates in WCF During Development" retrieved from http://msdn.microsoft.com/en-us/library/ff650751.aspx on Oct. 17, 2014. 5 pages.

(Continued)

*Primary Examiner* — Edward Zee
(74) *Attorney, Agent, or Firm* — Lowenstein Sandler LLP (57) ABSTRACT

A computing machine creates a local certificate authority (CA) that has certificate signing authority, creates a certificate signing request (CSR) that includes data of a local service that is hosted by the computing machine, creates a service certificate for the local service using at least a portion of the data in the CSR, signs the service certificate using a private key of the local CA, and provides the service certificate to the local service. The private key is stored locally on the computing machine.

20 Claims, 4 Drawing Sheets

(56) References Cited

U.S. PATENT DOCUMENTS

2010/0058058 A1    3/2010  Busari
2013/0166907 A1    6/2013  Brown et al.

OTHER PUBLICATIONS

Housley et al. "Internet X.509 Public Key Infrastructure Certificate and Certificate Revocation List (CRL) Profile" Apr. 2002. 130 pages.
Vratonjic et al. "The Inconvenient Truth about Web Certificates" 10th Workshop on Economics of Information Security, WEIS 2011 (Jun. 2011). 38 pages.
USPTO, Office Action for U.S. Appl. No. 14/566,489, dated Dec. 10, 2015.
USPTO, Notice of Allowance for U.S. Appl. No. 14/566,489, dated May 19, 2016.

* cited by examiner

CREATING A DIGITAL CERTIFICATE FOR A SERVICE USING A LOCAL CERTIFICATE AUTHORITY

CROSS-REFERENCE TO RELATED APPLICATION

This application is a continuation of U.S. patent application Ser. No. 14/566,489, filed Dec. 10, 2014, which is incorporated herein by reference.

FIELD

The present disclosure relates to certificates, and more particularly, to creating a digital certificate for a service using a local certificate authority.

BACKGROUND

For security purposes, many communications need to be secure (e.g., encrypted). Some communications, for example, for exchanging information between a client and a server, should be encoded in such a way that only the intended recipient should be able to receive the information. Traditionally, a public key infrastructure (PKI) can be used to create secure communications between a client and a server. PKI uses digital certificates that include information (e.g., a public key) that can be used to encrypt data. An entity (e.g., a server) that provides a service (e.g., a web application) can be issued a private key and a corresponding public key for the service. The public key can be included in a digital certificate that can be shared, for example, with a client. The client can use the service's public key to encrypt data and send the encrypted data to the server. The server can decrypt the received data using the service's private key.

When a client receives a digital certificate and public key, for example, from a server, the client generally first determines whether the client can trust that the digital certificate is indeed identifying the service in order to avoid a man-in-the-middle attack. A man-in-the-middle attack generally involves a malicious party that pretends to be the service which a client is trying to communicate with. For example, John Doe may use a client (e.g., a web browser) to log on to his bank's homepage www.bank.example to do online banking. John Doe may attempt to access www.bank.example, but the communication between the web browser and the bank's server providing the service may be intercepted and hijacked, and a malicious party that pretends to be the bank website can send a false bank web page to the web browser. The false bank web page can present a fake public key to the web browser. John Doe may input personal data into the false bank web page, and the web browser may use the public key to encrypt the personal data and submit the personal data to the malicious party.

To prevent man-in-the-middle attacks, a server (e.g., bank server) generally obtains a digital certificate for the service from a conventional third party top-level certificate authority. A traditional certificate authority (CA) is typically a third party organization that stores public keys and corresponding owner information, and is generally trusted by every party (e.g., web browser) in a communication. The parties are aware of the CA's public key.

An applicant (e.g., bank server) can send a request for a digital certificate to a remote third party CA. Prior to signing a digital certificate for an applicant (e.g., a bank server), a traditional CA typically performs various functions to verify an applicant's credentials to allow relying parties (e.g., web browsers) to trust the identity of the applicant and information in the digital certificate that is signed by the traditional CA. When a conventional CA has verified the identity of the applicant, the CA signs the digital certificate for the applicant (e.g., bank server) using the private key of the CA, and sends the digital certificate of the applicant (e.g., bank server) to the applicant, which the applicant can send to clients.

The CA has its own digital certificate (e.g., CA certificate) that includes the public key of the CA. The third party CA distributes its CA certificate to remote clients (e.g., web browsers). The clients that trust the remote third party CA can store the CA certificate in the client's trust store. When a client (e.g., web browser) receives a digital certificate for a service from a server (e.g., bank server), the client can determine that the signature of the digital certificate of the service corresponds to the CA certificate that the client has stored in its trust store. The client can use the information in the CA certificate to validate the identity of the service and trust that the public key that is received for the service can be used to create secure communications.

A digital certificate that is received from a traditional CA is generally expensive and can take a significant amount of time for the conventional CA to verify the identity of the applicant. In some scenarios, secure communications may be needed, but a digital certificate from a traditional CA cannot be obtained, for example, due to costs and/or time. For example, web application developers may wish to test a web banking application communicating with a client in a development, staging, and/or testing environment, and may not have the time or budget to obtain a digital certificate for the web banking application from a remote third party trusted CA.

Some developers may use a conventional self-signed certificate for development, staging, and/or testing purposes. Traditionally, a self-sign certificate is an identity certificate that is signed by the same entity whose identity it certifies. A developer usually generates a digital certificate for the web banking application, and rather than have a third party remote CA use the private key of the CA to sign the digital certificate, the web developer uses the private key of the web banking application to sign the digital certificate for itself. The web banking application acts as its own signing authority. Generally, the result is that no client (e.g., web browser) will trust a self-signed certificate because the client typically does not have a digital certificate for the web banking application in its trust store.

Some clients may manually add specific digital certificates that correspond to the signing authorities for self-signed certificates to a trust store. The manual addition of such specific digital certificates to the trust store, however, is vulnerable to man-in-the-middle attacks. For example, a malicious party may gain access to the digital certificate of the web banking application, and can use the digital certificate to sign digital certificates for any other malicious service. The clients that have the comprised digital certificate in its trust store would then automatically trust any digital certificate that was signed using the comprised digital certificate.

BRIEF DESCRIPTION OF THE DRAWINGS

The present disclosure will be understood more fully from the detailed description given below and from the accompanying drawings of various implementations of the disclosure.

DETAILED DESCRIPTION OF EMBODIMENTS

Implementations of the present disclosure describe creating a digital certificate for a service using a local certificate authority. A service can be provided by a server. A service can be, for example, an application, such as a web application. A client, such as a web browser, may attempt to access the service, and may need a secure (e.g., encrypted) connection with the service. The service can provide the public key of the service to the client, which the client can use to establish encrypted communications with the service. Prior to using the public key of the service, a client may first validate the identity of the service. The service can present the digital certificate of the service to the client as a means to validate its identity to the client. The communications between the service and the client may be in a pre-production environment, and rather than have a user (e.g., developer) create a self-signed certificate and manually add the signing authority to a client's trust store, implementations of the present disclosure provide a digital certificate for the service that is signed using a temporary CA that resides on the same computing machine as the service. Unlike the high risk of man-in-the-middle attacks that are associated with self-signed certificates, implementations of the present disclosure create a temporary CA that has temporary signing authority to prevent a malicious party from obtaining signing authority of the temporary CA and prevent the malicious party from causing man-in-the-middle attacks.

Rather than obtaining an expensive digital certificate from a conventional remote third party certificate authority (CA), implementations of the present disclosure provide an inexpensive means for the service to validate its identity to a client and provide trusted information (e.g., public key) that can be used to establish secure connections with a client trying to access the service locally from within the same computing machine, for example, for development, testing, and/or staging purposes, without using an expensive service certificate that is signed by a conventional remote third party trusted CA. Instead of waiting for an exhaustive time-consuming process of a traditional CA to verify credentials of an applicant, implementations of the present disclosure can provide a digital certificate for a service automatically and in a timely manner using a local temporary CA.

Figure 1:
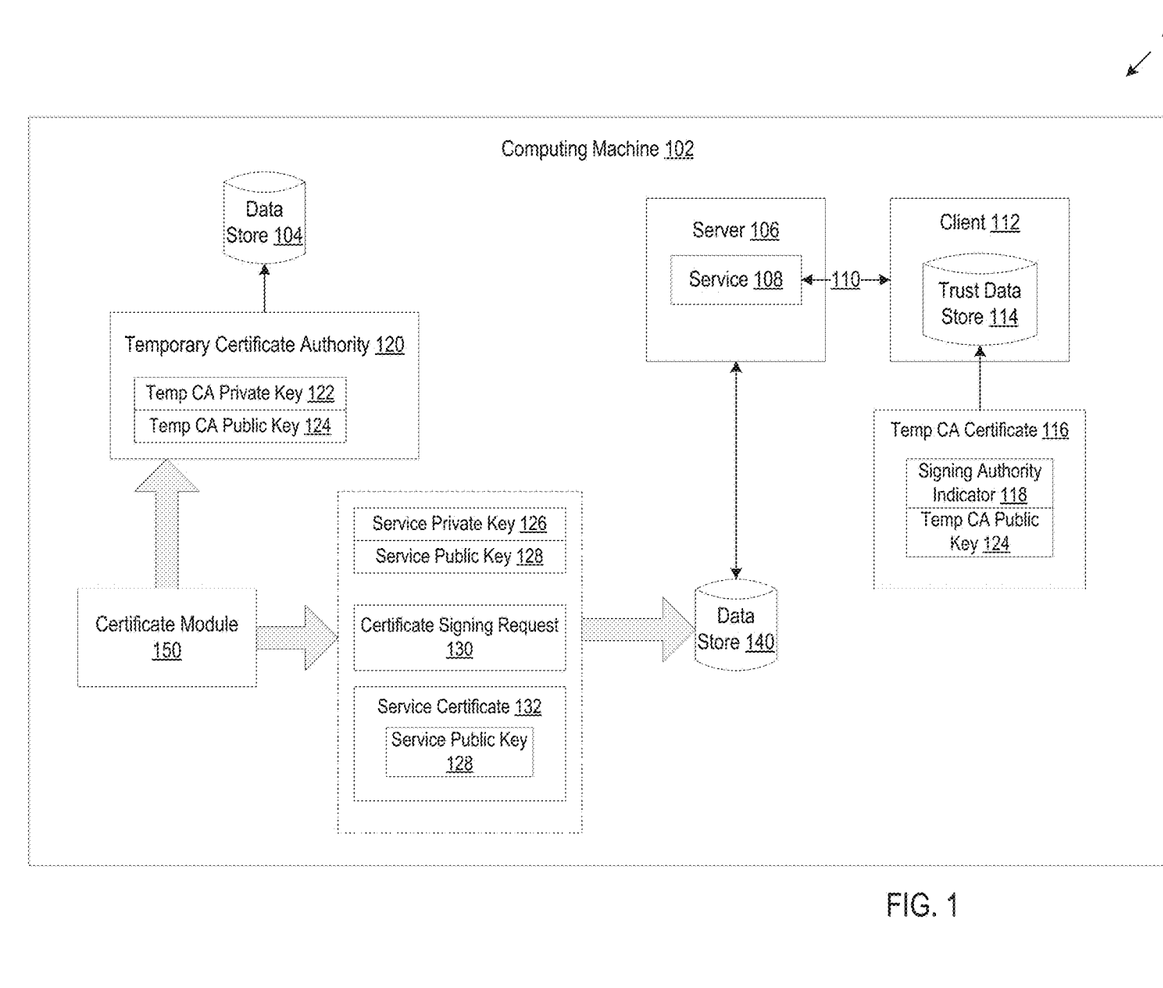
FIG. 1 illustrates example system architecture, in accordance with various implementations.

FIG. 1 is example system architecture 100 for various implementations. The system architecture 100 can include a computing machine 102. The computing machine 102 may be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like.

The computing machine 102 can host a server 106 that can provide a service 108. A service 108 can include, for example, an application. For example, the server 106 may be a web server that provides a web application as the service 108. An application can be any type of application including, for example, a web application, a desktop application, a database management application, a browser application, etc.

One or more clients 112 can access the service 108. The clients 112 can be hosted on the same computing machine 102 as the server 106 and service 108. For example, architecture 100 may be a service development environment, a service testing environment, and/or a staging environment, and a user (e.g., developer, quality engineer, system administrator) may wish to test a client 112 accessing the service 108. The client 112 can be for example, and not limited to, a web browser, and a command line interface management shell.

For security purposes, the communications between the client 112 and the service 108 may need to be secure (e.g., encrypted). For example, a user may wish to use client 112 to exchange information with the service 108, and the client 112 may attempt to validate the identity of the service 108 prior to exchanging data. In a public key infrastructure (PKI), the identity of a service (e.g., service 108) can be validated via a digital certificate (e.g., service certificate 132), which the service 108 can present to a client 112. The computing machine 102 can include a certificate module 150 to create a service certificate 132 for the local service 108. A certificate (e.g., service certificate 132, temporary CA certificate 116) hereinafter refers to a digital certificate throughout this document.

The certificate module 150 can create the service certificate 132 for the local service 108, and can create a temporary certificate authority (CA) 120 for signing the service certificate 132. The temporary CA 120 resides on the same computing machine 102 as the service 108. The temporary CA 120 is temporary in that the temporary CA 120 has a limit in its ability to sign service certificates (e.g., service certificate 132). The certificate module 150 can create the temporary CA 120 to initially have the ability to sign one or more service certificates (e.g., service certificate 132). In one implementation, the temporary CA 120 is configured with the ability to sign one or more service certificates 132 for a given signing session. The signing session can be defined for period of time (e.g., 30 seconds). The signing session can be configurable and/or user (e.g., system administrator, developer, quality engineer) defined. When one or more service certificates 132 are signed, the certificate module 150 can remove the ability of temporary CA 120 to sign other service certificates by destroying the signing authority of the temporary CA 120, as described in greater detail below. The removal of the temporary CA's 120 signing authority can help prevent the hijacking of the temporary CA's 120 signing authority by a malicious party.

The certificate module 150 creates the temporary CA 120 by generating a private key (e.g., temp CA private key 122) and a corresponding public key (e.g., temp CA public key 124) to represent the temporary CA 120. The key-pairs (e.g., temp CA private key 122 and temp CA public key 124, and service private key 126 and service public key 128) can be used for signing messages and for encrypting/decrypting data. For example, the private key (e.g., temp CA private key 122) of the temporary CA 120 can be used to sign the service certificate 132. The certificate module 150 can use public-key cryptography to generate pairs of keys consisting of a key that is private and a key that is public. Although different, the two parts of a key pair are mathematically linked. The public key can be used to encrypt plain text and/or to verify a digital signature. The private key can be used to decrypt cipher text and/or create a digital signature. The certificate module 150 can create a key pair using a public-key algorithm, such as, and not limited to, DSA (Digital Signature Algorithm) and the RSA (Rivest-Shamir-Adleman) algorithm.

The certificate module 150 can use a public-key algorithm (e.g., DSA, RSA) to generate a private key (e.g., temp CA private key 122) and a public key (e.g., temp CA public key 124) for the temporary CA 120. The temporary CA 120 is represented by the temp CA private key 122 and the temp CA public key 124, which both can be stored in a data store 104 on the computing machine 102. The data store 104 can be local non-persistent memory. The data store 104 can be secure kernel memory of the computing machine 102.

The certificate module 150 can use a public-key algorithm (e.g., DSA, RSA) to generate a private key (e.g., service private key 126) and a public key (e.g., service public key 128) for the local service 108. The service private key 126 and the service public key 128 can be stored in a data store 140 on the computing machine 102. The data store 140 can be a persistent storage that is capable of storing data. A persistent storage can be a local storage unit or a remote storage unit. Persistent storage can be a magnetic storage unit, optical storage unit, solid state storage unit, electronic storage units (main memory), or similar storage unit. Persistent storage can be a monolithic device or a distributed set of devices. A 'set', as used herein, refers to any positive whole number of items.

To generate the service certificate 132, the certificate module 150 can create a certificate signing request (CSR) 130 (also referred to as a certification request), and can use the information in the CSR 130 to create the service certificate 132, as described in greater detail below in conjunction with FIG. 3. The certificate module 150 can include the public key (e.g., service public key 128) of the service 108 in the service certificate 132. The CSR 130 is a digital message requesting that a digital certificate (e.g., service certificate 132) be signed for an applicant (e.g., service 108). The CSR 130 can include the service public key 128 and an applicant (e.g., service 108) identifier. In one implementation, the certificate module 150 signs the CSR 130 using the service private key 126, as described in greater detail below. The use of a private key (e.g., service private key 126, temp CA private key 122) to sign a message (e.g., service certificate 132, CSR 130) can be used by a recipient to validate that the message is from a sender that has a valid identity.

The certificate module 150 can have the service certificate 132 signed by the private key (e.g., temp CA private key 122) of the temporary CA 120 without sending the CSR 130 to the temporary CA 120. Unlike traditional digital certificate issuing systems, where a CSR is sent to a conventional remote third party CA, and the conventional remote third party CA would typically perform various functions to verify an applicant's credentials prior to signing a digital certificate for an applicant, the certificate module 150 can automatically sign the service certificate 132 using the temp CA private key 122. Traditional CAs typically use a variety of standards and tests to verify an applicant's credentials prior to signing a digital certificate of an applicant. Unlike a traditional CA, the temporary CA 120 has limited CA functionality that includes a subset of functions of a traditional CA. For example, the limited functionality of temporary CA 120 includes having digital certificates (e.g., service certificate 132, temp CA certificate 116) signed using the temp CA private key 122, and does not include, for example, performing tests to verify an applicant's credentials prior to using the temp CA private key 122 to sign the service certificate 132.

To use a private key (e.g., service private key 126, temp CA private key 122) to sign a message (e.g., service certificate 132, CSR 130), the certificate module 150 performs a hash function on data in a message to create a hash, and uses the private key to encrypt the hash to output a digital signature. The certificate module 150 can attach the digital signature, which was created using a private key, to the message to sign the message (e.g., service certificate 132, CSR 130).

The certificate module 150 can provide the service certificate 132 that is signed using the temp CA private key 122 to the service 108 using a local connection within the computing machine 102. The service certificate 132 that is signed using the temp CA private key 122 can be stored in a data store 140.

The certificate module 150 can disable the signing ability of the temporary CA 120 by destroying the private key (e.g., temp CA private key 122) of the temporary CA, as described in greater detail below in conjunction with FIG. 3. The certificate module 150 can remove the signing authority of the temporary CA 120 when the temp CA private key 122 has been used to sign one or more identified service certificates (e.g., service certificate 132) and/or when a signing session (e.g., 30 seconds) has expired.

The certificate module 150 can create a temporary (temp) CA certificate 116 that includes the public key of the temporary CA (e.g., temp CA public key 124). The certificate module 150 can sign the temp CA certificate 116 using the private key of the temporary CA (e.g., temp CA private key 122). The certificate module 150 can include a signing authority identifier 118 in the temporary CA certificate 116. The signing authority identifier 118 can indicate whether the subject (e.g., temporary CA 120) of a certificate (e.g., temp CA certificate 116) is a certificate authority and whether the public key (e.g., temp CA public key 124) in the certificate (e.g., temp CA certificate 116) can be used to verify certificate signatures. In one implementation, the signing authority identifier 118 is a basic constraints extension in the X.509 version 3 PKI standard, as described in greater detail below in conjunction with FIG. 3.

The certificate module 150 can automatically store the temp CA certificate 116 in the trust data store 114 of the client 112 to indicate that the client 112 trusts the temporary CA 120. The client 112 can attempt to establish a connection 110 with the service 108, and the service 108 can provide its service certificate 132 that is signed using the temp CA private key 122 to the client 112.

The client 112 can search the trust data store 114 for a CA certificate (e.g., temp CA certificate 116) that corresponds to the signature in the service certificate 132. The client 112 can verify the signature in the service certificate 132 by processing the signature value with the signer's corresponding public key (e.g., temp CA public key 124) that is included in the temp CA certificate 116 that is stored in the trust store 114. The client 112 can use a hash function that is specified in the temp CA certificate 116 and create a hash of the data in the service certificate 132. The client 112 can use the temp CA public key 124 to decrypt the signature of the service certificate 132 to output another hash. The client 112 can compare the two hashes to determine if there is a match. Success can confirm that the message (e.g., service certificate 132) is unmodified since it was signed, and that the client 112 can use the service public key 128 that is included in the service certificate 132 to create secure connections 110 with the service 108.

Figure 2:
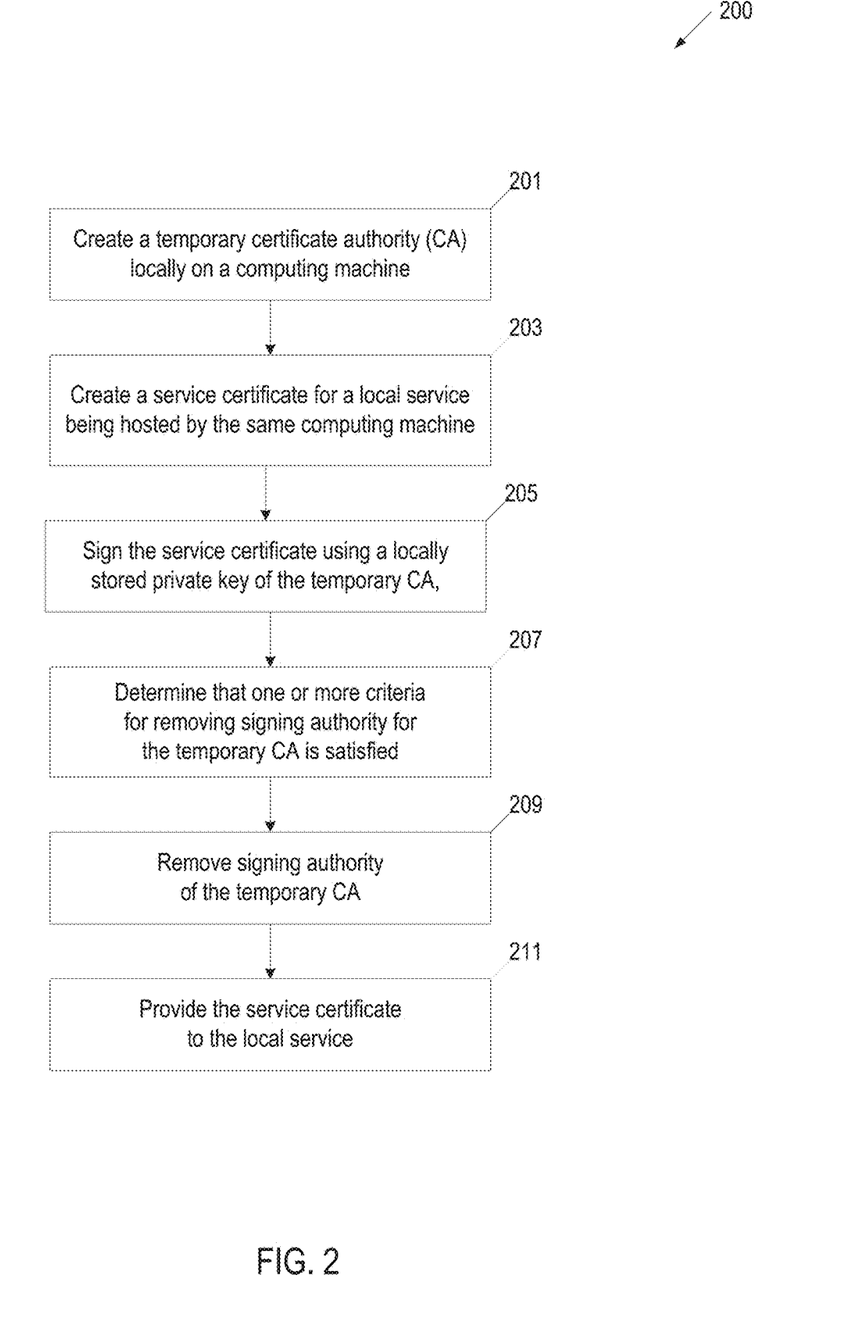
FIG. 2 is a flow diagram illustrating an implementation for a method for creating a digital certificate for a service using a local certificate authority having temporary signing authority.

FIG. 2 is a flow diagram for a method 200 for creating a digital certificate for a service using a local certificate authority, in accordance with one or more implementations of the present disclosure. Method 200 can be performed by processing logic that can comprise hardware (e.g., circuitry, dedicated logic, programmable logic, microcode, etc.), software (e.g., instructions run on a processing device), or a combination thereof. In one implementation, method 200 is performed by a certificate module (e.g., certificate module 150 of FIG. 1) executing in a computing machine. In one implementation, a certificate module (e.g., certificate module 150 of FIG. 1) is a script that can be executed by a processing device of a computing machine to perform method 200.

At block 201, the computing machine creates a temporary CA locally on the computing machine. The temporary CA can be represented by a private key and a public key. At block 203, the computing machine creates a service certificate for a local service being hosted by the computing machine. The temporary CA and the local service can both reside on the computing machine. The creation of the service certificate is described in greater detail below in conjunction with FIG. 3. At block 205, the computing machine signs the service certificate using a private key of the temporary CA. The private key is stored locally on the computing machine. At block 207, the computing machine determines that one or more criteria for removing the signing authority of the temporary CA are satisfied. The criteria can be stored as part of configuration data in a data store (e.g., data store 140 in FIG. 1). The criteria can be configurable and/or user (e.g., developer, quality engineer, system administrator) defined. For example, the criteria can include that the private key for the temporary CA has successfully been used to sign one or more service certificates, a time period (e.g., 30 second) for a signing session, and/or a combination of criteria. At block 209, the computing machine removes signing authority of the temporary CA. The removal of the signing authority of the temporary CA is described in greater detail below in conjunction with FIG. 3. At block 211, the computing machine provides the service certificate to the local service. The computing machine can provide the service certificate via local connection.

Figure 3:
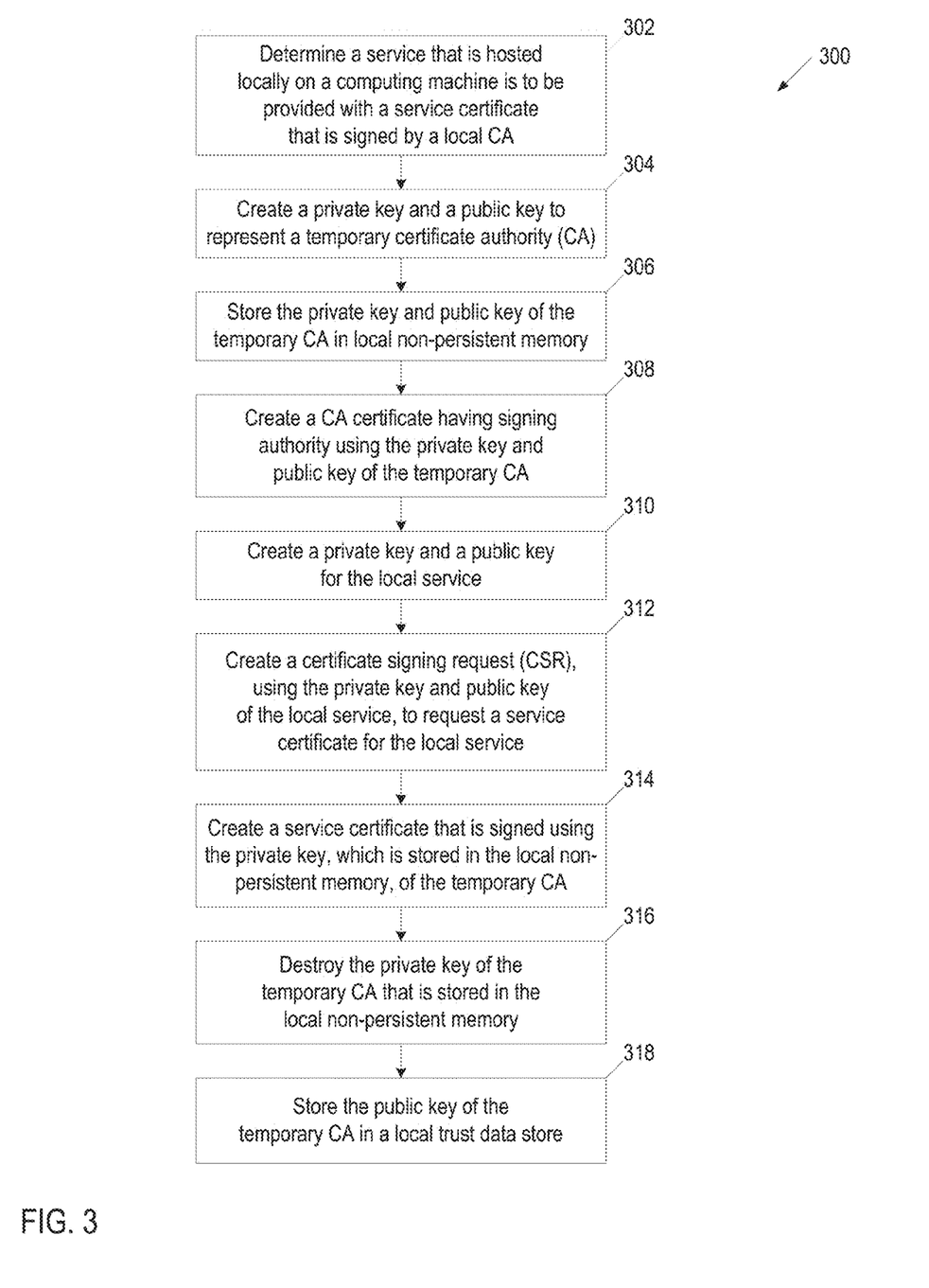
FIG. 3 is a flow diagram illustrating an implementation for a method for creating a local certificate authority having temporary signing authority to create a service certificate for a local service.

FIG. 3 is a flow diagram for a method 300 for creating a local certificate authority having temporary signing authority to create a service certificate for a local service, in accordance with one or more implementations of the present disclosure. Method 300 can be performed by processing logic that can comprise hardware (e.g., circuitry, dedicated logic, programmable logic, microcode, etc.), software (e.g., instructions run on a processing device), or a combination thereof. In one implementation, method 300 is performed by a certificate module (e.g., certificate module 150 of FIG. 1) executing in a computing machine. In one implementation, a certificate module (e.g., certificate module 150 of FIG. 1) is a script that can be executed by a processing device of a computing machine to perform method 300.

At block 302, the computing machine determines that a service hosted on the computing machine is to be provided with a service certificate that is signed by a local CA. In one implementation, the computing machine receives input (e.g., user input) to execute a script to perform the functions of the certificate module (e.g., certificate module 150 of FIG. 1). The user input can include a service identifier of the service that is to be provided with a service certificate that is signed by a local CA. The user input can include service information (e.g., location, etc.) for the service. The user input can specify more than one service that is to be provided with a service certificate that is signed by a local CA. At least a portion of method 300 can be iterative based on the number of services that are to be provided with a service certificate that is signed by a local CA and/or based on parameters of a signing session.

At block 304, the computing machine creates a private key and a public key to represent a temporary CA. The computing machine can use a public-key generation algorithm (e.g., DSA, RSA) that selects a private key uniformly at random from a set of possible private keys. The key generation algorithm can output the private key and a corresponding public key.

At block 306, the computing machine stores the private key of the temporary CA and the public key of the temporary CA in local non-persistent memory of the computing machine. For example, the private key of the temporary CA and the public key of the temporary CA can be stored locally in secure kernel memory of the computing machine.

At block 308, the computing machine creates a CA certificate having signing authority using the private key of the temporary CA and the public key of the temporary CA. The computing machine can include the public key of the temporary CA in the CA certificate. The computing machine can use the private key of the temporary CA to sign the CA certificate. The computing machine can include a signing authority indicator (e.g., signing authority indicator 118 in FIG. 1) in the CA certificate. In one implementation, the computing machine uses a X.509 version 3 PKI standard to create a signing authority indicator in the CA certificate. For example, the computing machine can use a basic constraints extension in the X.509 version 3 PKI standard to indicate whether the subject (e.g., temporary CA 120 in FIG. 1) of the certificate is a certificate authority and whether the public key that is included in the certificate can be used to verify certificate signatures. The X.509 version 3 PKI standard can be a Boolean-valued extension indicating whether a certificate is a CA certificate. For example, the computing machine can set the signing authority indicator to a TRUE value to indicate that the subject of the certificate is a certificate authority, the certificate is a CA certificate, and the public key that is included in the certificate can be used to verify certificate signatures. A signing authority indicator that is set to a FALSE value indicates that the subject of the certificate is not a certificate authority, the certificate is not a CA certificate, and the public key that is included in the certificate should not be used to verify certificate signatures.

At block 310, the computing machine creates a private key and a public key for the local service. The computing machine can use a key generation algorithm, such as DSA or the RSA algorithm.

At block 312, the computing machine creates a CSR using the private key and the public key of the local service. The CSR is a digital message to request a service certificate for the local service. In one implementation, the format of the CSR conforms to the public key cryptography standards (PKCS) #10 specification. The CSR can include an applicant identifier and the public key of service. In one implementation, the applicant identifier is a distinguished name as defined by the X.509 standard. The X.509 defines the distinguished name as a fully qualified domain name for the service. For example, the applicant identifier for the service may be 'www.example.com' or 'mail.example.com'. The computing machine signs the CSR using the private key of the service. In one implementation, the CSR does not include credentials or proofs of identity for the service.

At block 314, the computing machine creates a service certificate that is signed using the private key of the temporary CA. The private key of the temporary CA is stored in local non-persistent memory. The computing machine can use at least a portion of the data (e.g., applicant identifier and public key of the service) in the CSR to build a service certificate for the local service. The service certificate that is built can include, for example, a serial number to uniquely identify the service certificate, the subject (e.g., applicant identifier) identified, the algorithm used to create the signature, the issuer of the service certificate, a validity time period, and the public key of the local service. The computing machine uses a hash algorithm (e.g., SHA-1, SHA-512) to create a hash of the data in the service certificate, and encrypts the hash using the private key of the temporary CA to create a digital signature of the temporary CA. The computing machine attaches the digital signature of the temporary CA to the service certificate to sign the service certificate for the local service. The computing machine can include a label in the service certificate indicating that the service certificate is signed by a certificate authority and is not a self-signed certificate.

At block 316, the computing machine destroys the private key of the temporary CA that is stored in the local non-persistent memory. The computing machine can determine that one or more criteria for removing the signing authority of the temporary CA is satisfied and can destroy the private key of the temporary CA to remove the signing authority of the temporary CA. The computing machine can initially allocate memory to store the private key of the temporary CA. To destroy the private key of the temporary CA, the computing machine can deallocate (release or free) the memory that is storing the private key of the temporary CA. In one implementation, the computing machine can execute a function (e.g., free function) to release the memory and destroy the private key of the temporary CA.

At block 318, the computing machine stores the public key of the temporary CA in a local trust data store on the computing machine. The computing machine can store the public key of the temporary CA in the local trust data store by storing the temp CA certificate (e.g., temp CA certificate 116 in FIG. 1), which includes the public key of the temporary CA, in the local trust data store (e.g., trust data store 114 in FIG. 1). The local trust data store is accessible to one or more clients residing on the computing machine and attempting to access the local service. The computing machine can automatically store the public key of the temporary CA in the local trust data store. The computing machine can execute a command (e.g., update-ca-trust command) to add the temp CA certificate that includes the public key of the temporary CA to the local trust data store.

Figure 4:
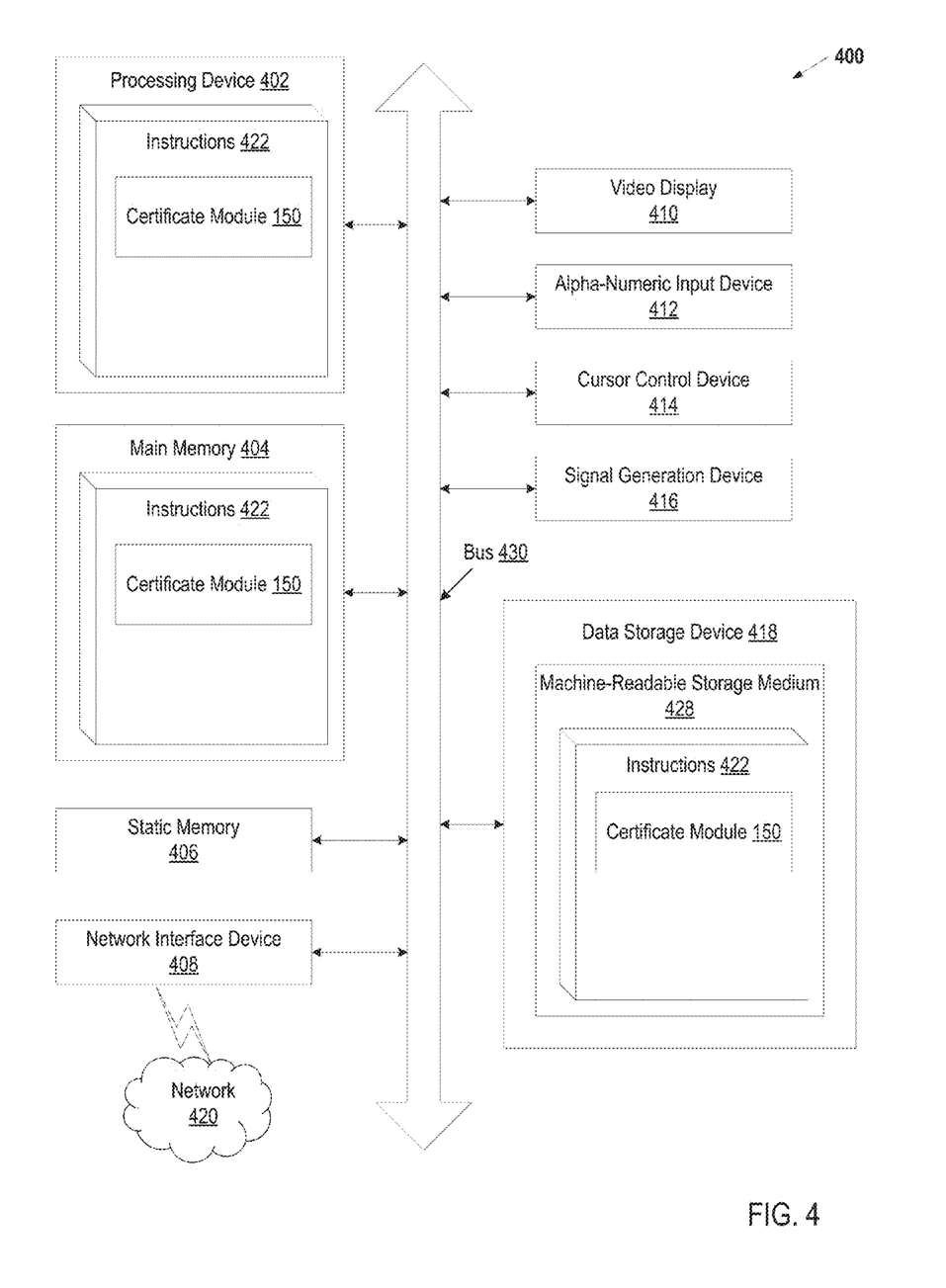
FIG. 4 is a block diagram of an example computer system that may perform one or more of the operations described herein.

FIG. 4 illustrates an example machine of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or DRAM (RDRAM), etc.), a static memory 406 (e.g., flash memory, static random access memory (SRAM), etc.), and a data store device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute instructions 422 for performing the operations and steps discussed herein.

The computer system 400 may further include a network interface device 408. The computer system 400 also may include a video display unit 410 (e.g., a liquid crystal display (LCD) or a cathode ray tube (CRT), an alphanumeric input device 412 (e.g., a keyboard), a cursor control device 414 (e.g., a mouse), and a signal generation device 416 (e.g., speaker).

The data storage device 418 may include a machine-readable storage medium 428 (also known as a computer-readable medium) on which is stored one or more sets of instructions or software 422 embodying any one or more of the methodologies or functions described herein. The instructions 422 may also reside, completely or at least partially, within the main memory 404 and/or within the processing device 402 during execution thereof by the computer system 400, the main memory 404 and the processing device 402 also constituting machine-readable storage media.

In one implementation, the instructions 422 include instructions for a certificate module (e.g., certificate module 150 of FIG. 1), and/or a software library containing methods that call the certificate module. While the machine-readable storage medium 428 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "creating" or "signing" or "removing" or "providing" or "determining" or "storing" or "destroying" or "sending" or "destroying" or "deallocating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   creating a local certificate authority (CA) hosted by a computing machine, the local CA having certificate signing authority for a signing session defined by a period of time;
   creating a certificate signing request (CSR) comprising data of a local service being hosted by the computing machine;
   creating, by a processing device, a service certificate for the local service using at least a portion of the data in the CSR;
   signing the service certificate using a private key of the local CA, the private key being stored locally on the computing machine; and
   providing the service certificate to the local service.

2. The method of claim 1, further comprising:
   removing the signing authority of the local CA.

3. The method of claim 2, further comprising:
   creating a plurality of CSRs for a plurality of local services, the plurality of CSRs comprising data of respective local services;
   creating service certificates for the plurality of local services using the data in the respective CSRs;
   signing the service certificates using the private key of the local CA prior to removing the signing authority of the local CA; and
   providing the service certificates to the respective local services.

4. The method of claim 2, wherein removing the signing authority of the local CA comprises:
   determining that one or more criteria for removing signing authority for the local CA are satisfied.

5. The method of claim 2, wherein removing the signing authority of the local CA comprises:
   destroying a private key of the local CA, wherein the private key of the local CA is stored in local non-persistent memory.

6. The method of claim 1, wherein creating the local CA comprises:
   creating the private key and a public key to represent the local CA;
   storing the private key and the public key in local non-persistent memory; and
   creating a CA certificate having signing authority, wherein the CA certificate is created using the private key and public key of the local CA.

7. The method of claim 1, further comprising:
   signing, by the processing device, the CSR using a locally stored private key of the local service.

8. A non-transitory computer-readable storage medium comprising instructions that, when executed by a processing device of a computing machine, cause the processing device to:
   create a certificate signing request (CSR) comprising data of a local service being hosted by the computing machine for a signing session defined by a period of time;
   create a service certificate for the local service using at least a portion of the data in the CSR;

sign, by the processing device, the service certificate using data of a local certificate authority (CA) hosted by the computing machine; and provide the service certificate to the local service.

9. The non-transitory computer-readable storage medium of claim 8, wherein the processing device is further to:

remove signing authority of the local CA.

10. The non-transitory computer-readable storage medium of claim 9, wherein the processing device is further to:

create a plurality of CSRs for a plurality of local services, the plurality of CSRs comprising data of respective local services;

create service certificates for the plurality of local services using the data in the respective CSRs;

sign the service certificates using the private key of the local CA prior to removing the signing authority of the local CA; and provide the service certificates to the respective local services.

11. The non-transitory computer-readable storage medium of claim 9, wherein the processing device is further to:

determine that one or more criteria to remove the signing authority for the local CA are satisfied.

12. The non-transitory computer-readable storage medium of claim 9, wherein to remove the signing authority of the local CA, the processing device is to:

destroy a private key of the local CA, wherein the private key of the local CA is stored in local non-persistent memory.

13. The non-transitory computer-readable storage medium of claim 8, wherein to create the local CA, the processing device is to:

create a private key and a public key to represent the local CA;

store the private key and the public key in local non-persistent memory; and create a CA certificate having signing authority, wherein the CA certificate is created using the private key and public key of the local CA.

14. The non-transitory computer-readable storage medium of claim 8, wherein the data of the local CA comprises a locally stored private key of the local CA.

15. A computing machine comprising:

a memory;

a processing device, operatively coupled to the memory, to:

create a certificate signing request (CSR) comprising data of a local service being hosted by the computing machine for a signing session defined by a period of time;

create a service certificate for the local service using at least a portion of the data in the CSR;

sign the service certificate using data of a local certificate authority (CA) hosted by the computing machine; and provide the service certificate to the local service.

16. The computing machine of claim 15, wherein the processing device is further to:

remove signing authority of the local CA.

17. The computing machine of claim 16, wherein the processing device is further to:

create a plurality of CSRs for a plurality of local services, the plurality of CSRs comprising data of respective local services;

create service certificates for the plurality of local services using the data in the respective CSRs;

sign the service certificates using the private key of the local CA prior to removing the signing authority of the local CA; and provide the service certificates to the respective local services.

18. The computing machine of claim 16, wherein to remove the signing authority of the local CA, the processing device is to:

destroy a private key of the local CA, wherein the private key of the local CA is stored in local non-persistent memory.

19. The computing machine of claim 15, wherein the data of the local CA comprises a locally stored private key of the local CA.

20. The computing machine of claim 15, wherein to create the local CA, the processing device is to:

create a private key and a public key to represent the local CA;

store the private key and the public key in local non-persistent memory; and create a CA certificate having signing authority, wherein the CA certificate is created using the private key and public key of the local CA.

\* \* \* \* \*